US012785083B2

(12) United States Patent
Kwon et al.

(10) Patent No.: US 12,785,083 B2
(45) Date of Patent: Nov. 3, 2026

(54) POSITIVE ACTIVE MATERIAL FOR RECHARGEABLE LITHIUM BATTERY, AND RECHARGEABLE LITHIUM BATTERY INCLUDING SAME

(71) Applicants: POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Ohmin Kwon, Incheon (KR); Sang Cheol Nam, Seoul (KR); Kwon Young Choi, Seoul (KR); Jung Hoon Song, Gwacheon-si (KR); Sanghyuk Lee, Incheon (KR); Inchul Park, Incheon (KR)

(73) Assignees: POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 710 days.

(21) Appl. No.: 18/268,046

(22) PCT Filed: Nov. 15, 2021

(86) PCT No.: PCT/KR2021/016664

§ 371 (c)(1),
(2) Date: Jul. 25, 2023

(87) PCT Pub. No.: WO2022/131571

PCT Pub. Date: Jun. 23, 2022

(65) Prior Publication Data

US 2024/0006594 A1 Jan. 4, 2024

(30) Foreign Application Priority Data

Dec. 18, 2020 (KR) ........................ 10-2020-0178623

(51) Int. Cl.
*H01M 4/36* (2006.01)
*C01G 53/00* (2025.01)
(Continued)

(52) U.S. Cl.
CPC ............ *H01M 4/366* (2013.01); *C01G 53/50* (2013.01); *C01G 53/82* (2025.01); *H01M 4/38* (2013.01);
(Continued)

(58) Field of Classification Search
CPC .................................................... H01M 4/366
See application file for complete search history.

(56) References Cited

U.S. PATENT DOCUMENTS

2014/0154581 A1 6/2014 Kawasato et al.
2016/0013479 A1 1/2016 Iwasaki
(Continued)

FOREIGN PATENT DOCUMENTS

JP 2010-40383 A 2/2010
JP 2013-191579 A 9/2013
(Continued)

OTHER PUBLICATIONS

International Search Report for PCT/KR2021/016664 dated Mar. 23, 2022.
(Continued)

*Primary Examiner* — Christopher P Domone
(74) *Attorney, Agent, or Firm* — Sughrue Mion, PLLC

(57) ABSTRACT

It relates to a positive electrode active material for a lithium secondary battery and a lithium secondary battery including the same, wherein the positive electrode active material for
(Continued)

lithium secondary battery, comprising: a core containing a lithium nickel-based compound having a Ni content of 80 mol % or more; and a coating material positioned on at least a portion of the core surface; wherein, the coating material includes a first coating material containing at least one of group 5 elements and group 6 elements; and S; and a second coating material including B, LiOH, $Li_2CO_3$ and $Li_2SO_4$, and the second coating material is a needle-like material.

10 Claims, 4 Drawing Sheets

(51) Int. Cl.

| | |
|---|---|
| ***C01G 53/50*** | (2025.01) |
| ***C01G 53/82*** | (2025.01) |
| ***H01M 4/38*** | (2006.01) |
| ***H01M 4/505*** | (2010.01) |
| ***H01M 4/525*** | (2010.01) |
| ***H01M 4/58*** | (2010.01) |
| ***H01M 10/052*** | (2010.01) |

(52) U.S. Cl.
CPC ........... *H01M 4/505* (2013.01); *H01M 4/525* (2013.01); *H01M 4/5825* (2013.01); *H01M 10/052* (2013.01); *C01P 2004/03* (2013.01); *C01P 2006/40* (2013.01)

(56) References Cited

U.S. PATENT DOCUMENTS

| | | | | |
|---|---|---|---|---|
| 2018/0123130 | A1 | 5/2018 | Kim et al. | |
| 2018/0219219 | A1* | 8/2018 | Ito | H01M 4/505 |
| 2019/0123347 | A1 | 4/2019 | Kim et al. | |

FOREIGN PATENT DOCUMENTS

| | | | |
|---|---|---|---|
| JP | 2014-67508 | A | 4/2014 |
| JP | 2014-197540 | A | 10/2014 |
| JP | 2015-230789 | A | 12/2015 |
| JP | 2017-220339 | A | 12/2017 |
| JP | 2020-64858 | A | 4/2020 |
| JP | 2020-129481 | A | 8/2020 |
| KR | 10-2014-0053451 | A | 5/2014 |
| KR | 10-2015-0050458 | A | 5/2015 |
| KR | 10-2015-0090215 | A | 8/2015 |
| KR | 10-2016-0050835 | A | 5/2016 |
| KR | 10-2016-0136688 | A | 11/2016 |
| KR | 10-2017-0117541 | A | 10/2017 |
| KR | 10-2018-0076275 | A | 7/2018 |
| KR | 10-2019-0051862 | A | 5/2019 |
| KR | 10-2019-0079526 | A | 7/2019 |
| KR | 10-2019-0116999 | A | 10/2019 |
| KR | 10-2020-0029909 | A | 3/2020 |
| KR | 10-2020-0036623 | A | 4/2020 |
| WO | 2006/027925 | A2 | 3/2006 |
| WO | 2020/174937 | A1 | 9/2020 |

OTHER PUBLICATIONS

Written Opinion for PCT/KR2021/016664 dated Mar. 23, 2022.
Extended European Search Report issued Dec. 17, 2024 in Application No. 21906876.4.
Communication dated Oct. 8, 2024 in Japanese Application No. 2023-537011.
Communication dated Mar. 28, 2026, issued in Chinese Application No. 202180085367.6.

* cited by examiner

【FIG. 1】
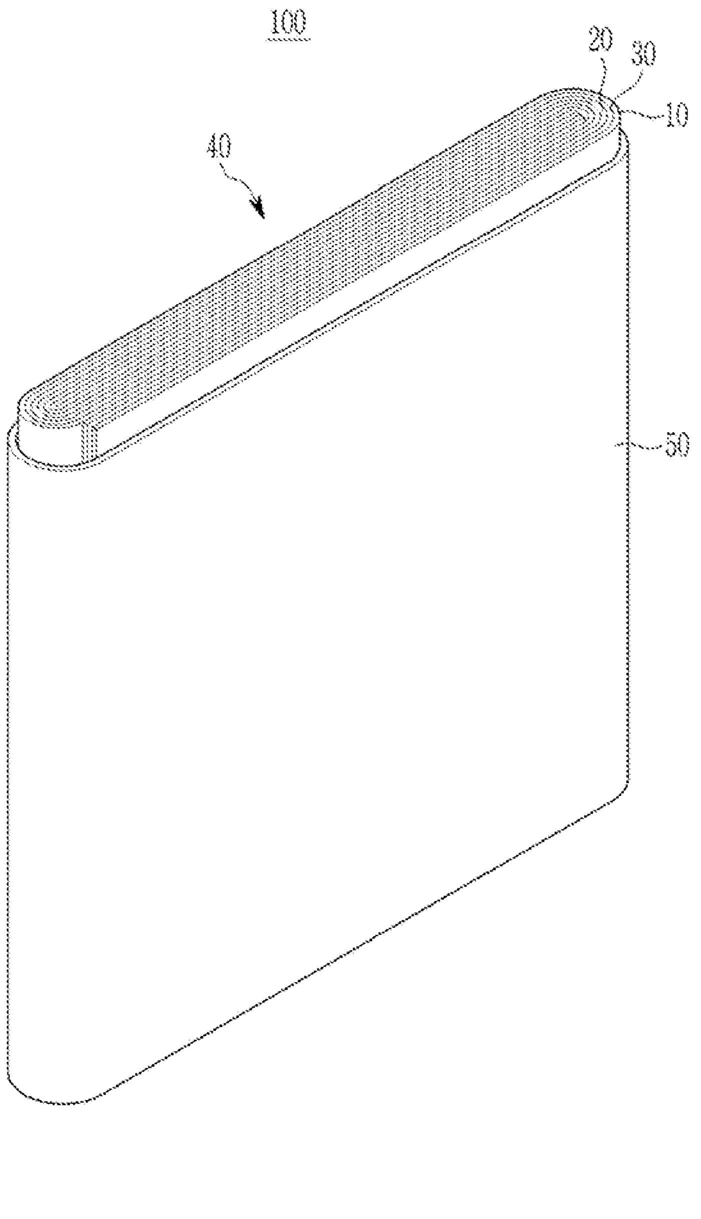

【FIG. 2】
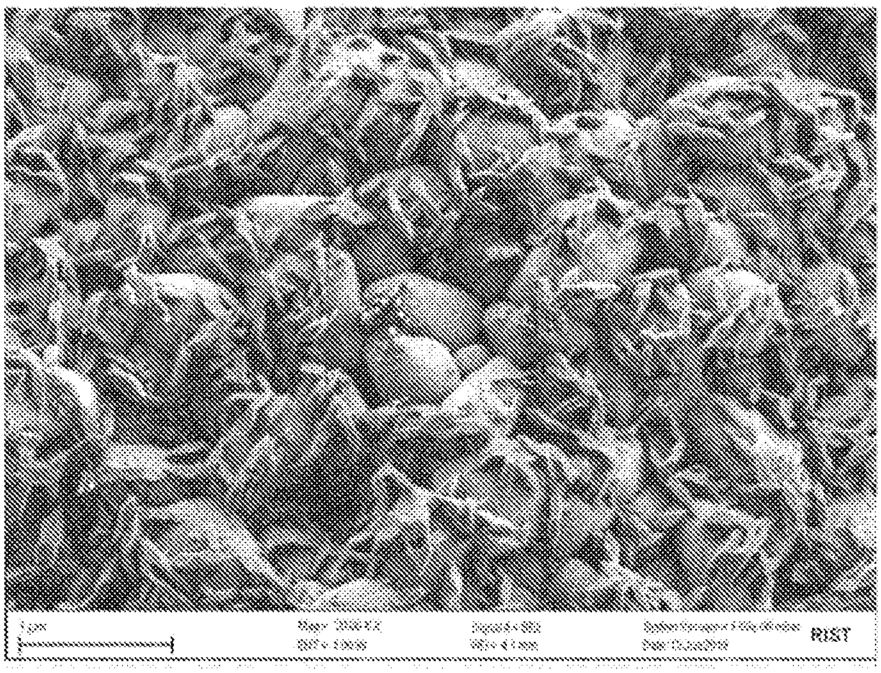
【FIG. 3】
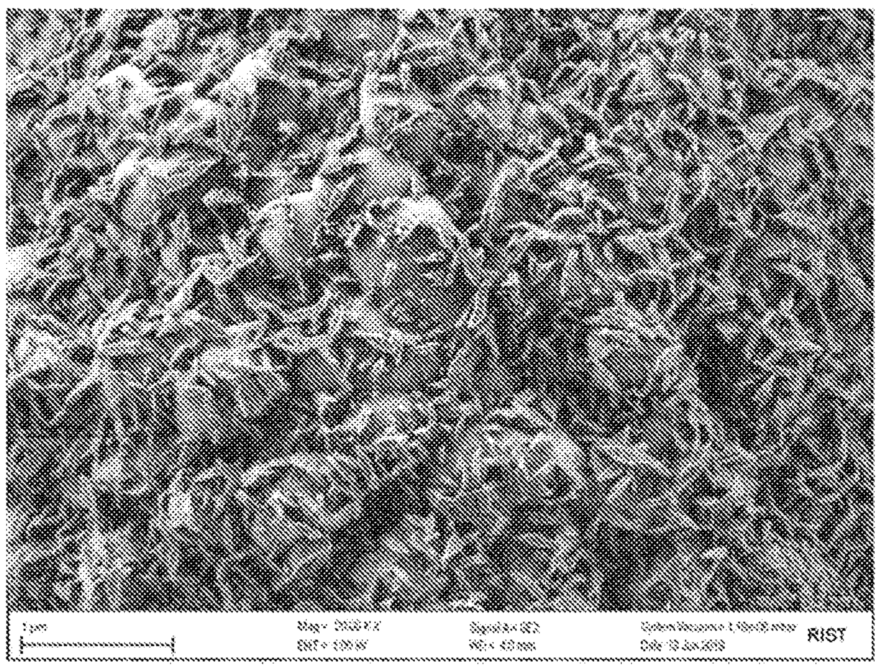

【FIG. 4】
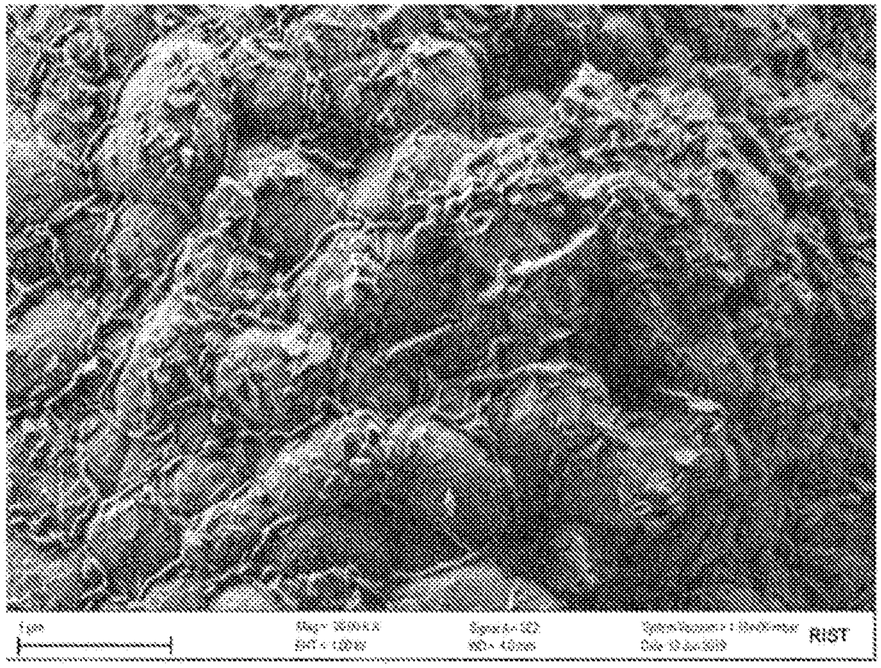
【FIG. 5】
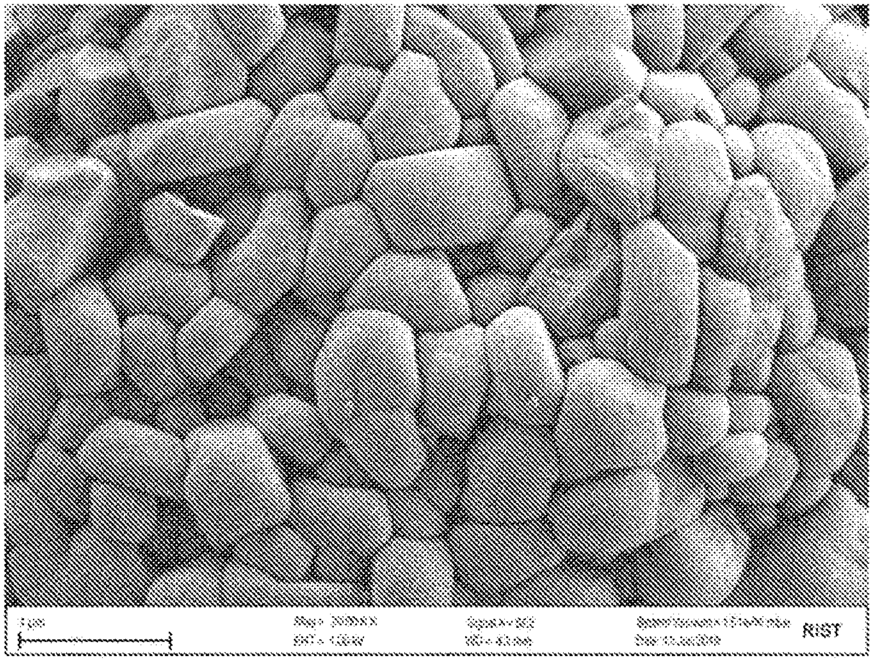

【FIG. 6】
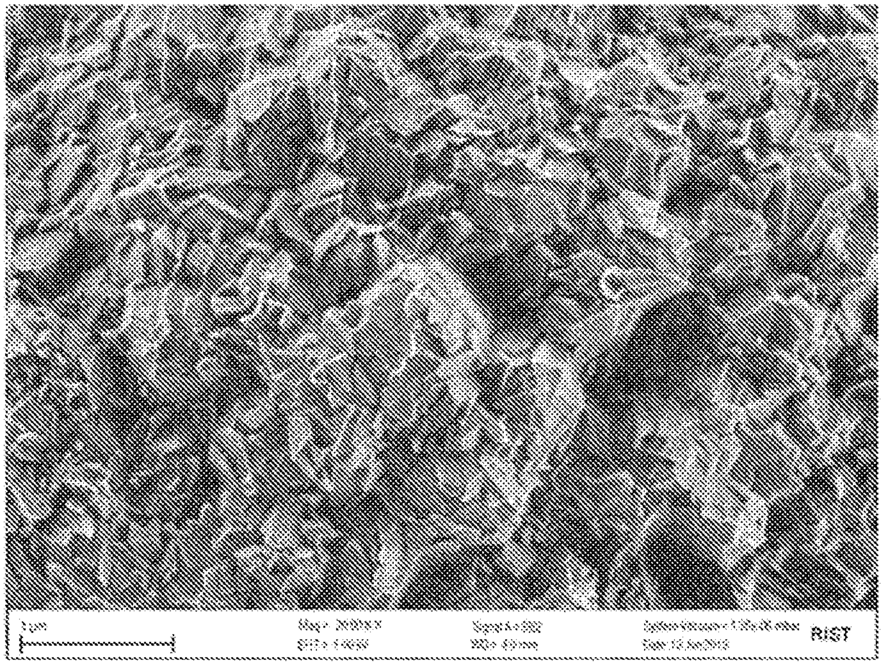

POSITIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

This application is a National Stage of International Application No. PCT/KR2021/016664 filed Nov. 15, 2021, claiming priority based on Korean Patent Application No. 10-2020-0178623 filed in the Korean Intellectual Property Office on Dec. 18, 2020, the entire contents of which are incorporated herein by reference.

FIELD OF THE INVENTION

It is related that a positive electrode active material, its manufacturing method, and a lithium secondary battery including the same.

DESCRIPTION OF THE RELATED ART

Recently, there is an explosive increase in demand for IT mobile devices and small electric power devices (e-bikes, small EVs, etc.), and there is a demand for electric vehicles with a driving distance of 400 km or more. Accordingly, the development of secondary batteries having high-capacity and a high energy density to drive them is being actively conducted worldwide.

In order to manufacture such a high-capacity battery, it is necessary to use a high-capacity positive electrode active material. Among the existing layered positive electrode active materials, the highest capacity material is $LiNiO_2$ (275 mAh/g). However, structural collapse occurs easily during charging and discharging, and thermal stability due to oxidation number problem is low, making it difficult to commercially available.

Therefore, research on high-capacity positive electrode active materials continues.

SUMMARY OF THE INVENTION

One embodiment is to provide a positive electrode active material for a lithium secondary battery with excellent electrochemical stability.

Another embodiment is to provide a lithium secondary battery including the positive electrode active material.

According to one embodiment, it is provided a positive electrode active material for lithium secondary battery, comprising: a core containing a lithium nickel-based compound having a Ni content of 80 mol % or more; and @@@ a coating material positioned on at least a portion of the core surface; wherein, the coating material includes a first coating material containing at least one of group elements and group 6 elements; and S; and a second coating material including B, LiOH, $Li_2CO_3$ and $Li_2SO_4$, and the second coating material is a needle-like material.

the needle-like material has a major axis and a minor axis, and the length ratio of the major axis L1 and the minor axis L2 satisfies the relationship of Equation 1 below.

$$0.1<(L2/L1)<1.00 \quad \text{[Equation 1]}$$

The core in the positive electrode active material includes a secondary particle assembled with at least one primary particle including the lithium nickel-based compound.

The lithium nickel-based compound is represented by Chemical Formula 1 below.

$$Li(Ni_{1-(x+y)}Co_xMn_yX_z)O_2, \quad \text{[Chemical Formula 1]}$$

(In the Chemical Formula 1, 0<(x+y)<0.2, 0≤x≤0.2 and 0≤z≤0.2, and

X includes at least one or more of Zr, Al, Ti, B, Mg, Ce, Si, Na, and Zn.)

The first coating material is positioned on at least a portion of the primary particle surface and at least a portion of the secondary particle surface. Also, the second coating material is to position at least part of the secondary particle surface.

At least one of the Group 5 and Group 6 elements is V, Nb, W or a combination thereof.

The content of the group 5 element and group 6 element is 10 ppm to ppm based on the total amount of the positive electrode active material.

The content of the LiOH is 100 ppm to 10,000 ppm based on the total amount of the positive electrode active material.

The content of the $Li_2SO_4$ is 10 ppm to 3,000 ppm based on the total amount of the positive electrode active material.

According to another embodiment, a lithium secondary battery including a positive electrode including the positive electrode active material, a negative electrode including a negative active material, and a non-aqueous electrolyte is provided.

A positive electrode active material for a lithium secondary battery according to one embodiment may exhibit an excellent cycle characteristic and a low resistance increase rate.

BRIEF DESCRIPTION OF THE DRAWINGS

FIG. 1 is a drawing schematically showing the structure of a lithium secondary battery according to one embodiment.

FIG. 2 is a SEM of the positive electrode active material prepared according to exemplary embodiment 1.

FIG. 3 is a photograph showing the major axis and minor axis of the SEM image shown in FIG. 2.

FIG. 4 is a SEM of the positive electrode active material prepared according to Comparative Example 1.

FIG. 5 is a SEM of the positive electrode active material prepared according to Comparative Example 2.

FIG. 6 is a SEM of the positive electrode active material prepared according to Comparative Example 3.

DETAILED DESCRIPTION OF THE EMBODIMENTS

Hereinafter, embodiments of the present invention will be described in detail. However, this is presented as an example, and the present invention is not limited thereby, and the present invention is only defined by the scope of claims to be described later.

In this specification, unless otherwise noted, % means wt %, and 1 ppm means 0.0001 wt %.

According to one embodiment, it is provided a positive electrode active material for lithium secondary battery, comprising: a core containing a lithium nickel-based compound having a Ni content of 80 mol % or more; and @@@ a coating material positioned on at least a portion of the core surface; wherein, the coating material includes a first coating material containing at least one of group elements and group 6 elements; and S; and a second coating material including B, LiOH, $Li_2CO_3$ and $Li_2SO_4$.

Particularly, the second coating material is a needle-like material

The needle-like material has a major axis and a minor axis, and the length ratio of the major axis L1 and the minor axis L2 satisfies the relationship of Equation 1 below.

$$0.1<(L2/L1)<1.00 \quad \text{[Equation 1]}$$

When the length ratio (L2/L1) of the major axis L1 and the minor axis L2 of the needle-like material satisfies the Equation 1, a more excellent cycle characteristic and a low resistance increasing rate can be exhibited. According to one embodiment, a length ratio (L2/L1) of the major axis L1 and the minor axis L2 may be greater than 0.2 and less than or equal to 0.5.

If the length ratio (L2/L1) of the major axis L1 and the minor axis L2 is 0.1 or less, the length of the major axis is too large compared to the minor axis, and there may be a problem that resistance may increase due to impurities being contained. A case where the length ratio (L2/L1) of the major axis L1 and the minor axis L2 is 1.0 or more is not appropriate because the length of the major axis and the minor axis are the same or the minor axis is longer than the major axis.

In addition, a coating material in the positive electrode active material according to one embodiment, includes a first coating material and a second coating material, and then high-capacity of the positive electrode active material can be secured. Excellent high temperature cycle characteristics can be obtained, and initial resistance and resistance increasing rate can be reduced. The effect is obtained, when it is included such a coating material, wherein a first coating material containing any one or more of group 5 elements and group 6 elements, and S, and a second coating material including B, LiOH, $Li_2CO_3$ and $Li_2SO_4$, particularly, the second coating material is a needle-like material.

In addition, the effect of using such a coating material is more excellent when using a high-nickel (High-Ni) lithium nickel-based compound having a Ni content of 80 mol % or more as a core, for example, a compound represented by Chemical Formula 1 below. Even if a coating material including a first coating material and a second coating material according to one embodiment is included, when using a lithium nickel-based compound having a Ni content of less than 80 mol % as a core or using a compound that does not contain nickel, as the resistance and resistance increase rate are sufficiently small, the effect of including the first coating material and the second coating material cannot be obtained.

$$Li(Ni_{1-(x+y)}Co_xMn_yX_z)O_2, \quad \text{[Chemical Formula 1]}$$

(In the Chemical Formula 1, $0<(x+y)<0.2$, $0\leq x\leq 0.2$, $0\leq y\leq 0.2$ and $0\leq z\leq 0.2$, and X includes at least one or more of Zr, Al, Ti, B, Mg, Ce, Si, Na, and Zn.)

According to one embodiment, X may be Zr and Al. Since Zr ions occupy Li sites, Zr serves as a kind of pillar and can further stabilize the layered structure by alleviating contraction of the lithium ion path (lithium ion path) during the charging and discharging process. In addition, Al can further stabilize the layered structure of the positive electrode active material. Therefore, the cycle-life characteristics of the lithium secondary battery can be further improved.

The core may include secondary particles assembled with at least one primary particle including the lithium nickel-based compound. The first coating material is positioned on at least a portion of the primary particle surface and at least a portion of the secondary particle surface. Also, the second coating material is to position at least part of the secondary particle surface.

In this way, as the first coating material is positioned on both the primary and secondary particle surfaces, and the second coating material is positioned only on the secondary particle surface, the effect of suppressing the increase in resistance and improving cycle-life can be obtained. This effect cannot be obtained when both the first coating material and the second coating material are positioned only on the secondary particle surface, because the primary particle surface deteriorates. Alternatively, even when the first coating material and the second coating material are positioned on both the primary particle surface and the secondary particle surface, the effect of suppressing the resistance increase rate and improving cycle-life according to one embodiment cannot be obtained, because resistance increases. In addition, since the resistance increases even when the first coating material is positioned only on the secondary particle surface and the second coating material is positioned on both the primary and secondary particle surfaces, the desired effect cannot be obtained.

Among the first coating materials, at least one of a group 5 elements and a group 6 elements may be V, Nb, W or a combination thereof.

In the positive electrode active material, the content of the group 5 element and the group 6 element may be 10 ppm to 10,000 ppm, 30 ppm to 5,000 ppm, 80 ppm to 2,000 ppm, 300 ppm to 800 ppm based on the total amount of the positive electrode active material. In the positive electrode active material, when the content of the Group 5 element and the Group 6 element are included in the range, excellent cycle characteristics can be exhibited without increasing the resistance increase rate.

The content of the LiOH may range from 100 ppm to 10,000 ppm, more specifically from 500 ppm to 7,000 ppm, and more specifically from 1,200 ppm to 3,000 ppm based on the total amount of the positive electrode active material. In the positive electrode active material, if the content of LiOH satisfies the range, excellent initial charge and discharge efficiency and cycle characteristics can be further improved.

The content of the $Li_2CO_3$ may range from 1,000 ppm to 5,000 ppm, more specifically from 1,500 ppm to 4,000 ppm, and more specifically from 2,000 ppm to 3,500 ppm based on the total amount of the positive electrode active material. When the content of $Li_2CO_3$ satisfies the range, excellent room temperature and high temperature cycle-life characteristics can be further improved, and the resistance increase rate can be further reduced.

The content of the $Li_2SO_4$ may range from 10 ppm to 10,000 ppm, more specifically from 80 ppm to 3,000 ppm, more specifically from 100 ppm to 2,000 ppm, more specifically from 100 ppm to 800 ppm, more specifically from 100 ppm to 400 ppm, based on the total amount of the positive electrode active material. When the content of $Li_2SO_4$ satisfies the range, excellent capacity characteristics can be well secured, while cycle characteristics can be further improved and the initial resistance value can be further reduced.

The content of the B may be 300 ppm to 2,000 ppm or 300 ppm to 1,000 ppm based on the total amount of the positive electrode active material. When the content of B satisfies the range, it is possible to secure a capacitance characteristic well, simultaneously further improve the cycle characteristic and further reduce the initial resistance value.

Another embodiment provides a manufacturing method of the positive electrode active material. This manufacturing method comprises:

- preparing a first mixture by mixing a precursor compound containing nickel, cobalt and manganese with a compound containing X (where X is at least one of Zr, Al, Ti, B, Mg, Ce, Si, Na and Zn),
- preparing a cooling product by performing a first heat treatment and cooling the first mixture;
- preparing a cleaned product by washing the cooled product with a solution containing a compound containing any one or more of a Group 5 elements and a Group 6 element and a S source,
- preparing a second mixture by mixing the cleaned product with LiOH, boron compound and $Li_2SO_4$ to and
- performing a secondary heat treatment of the second mixture.

Hereinafter, the manufacturing method will be described in more detail.

First, a precursor compound including nickel, cobalt and manganese, a lithium-containing compound, and an X-containing compound (X is at least one of Zr, Al, Ti, B, Mg, Ce, Si, Na and Zn) are mixed and prepare the first mixture.

The precursor compound containing nickel, cobalt and manganese is formed by mixing nickel raw material, cobalt raw material and manganese raw material in water to prepare a metal salt aqueous solution, performing co-precipitation reaction, filtering and drying. At this time, the amount of nickel raw material, cobalt raw material and manganese raw material used can be appropriately adjusted so as to obtain the final core composition of the Chemical Formula 1.

The co-precipitation reaction can be performed by purging inert gas to prevent oxidation of metal ions, and can be performed at 10° C. to 70° C. temperature.

The inert gas may be $N_2$, argon gas or a combination thereof.

In addition, the co-precipitation reaction can be carried out by adding a chelating agent and a pH adjusting agent to the metal salt aqueous solution. The chelating agent may be $NH_4(OH)$, but is not limited thereto, and the pH adjusting agent may be NaOH, but is not limited thereto.

The drying process can be carried out at 80° C. to 200° C. for 1 hour to 48 hours.

The average particle diameter D50 of the precursor compound can be 10 μm to 20 μm, but is not limited thereto. Unless otherwise defined in this specification, average particle diameter D50 means the diameter of particles whose cumulative volume is 50% by volume in the particle size distribution, and can be measured with a particle size analyzer (PSA).

As the lithium compound, lithium hydroxide, lithium carbonate, lithium nitrate, a hydrate thereof, or a combination thereof may be used.

The X-containing raw material may be an X-containing oxide, an X-containing nitrate, an X-containing hydroxide, or a combination thereof.

The mixing ratio of the precursor compound, the lithium compound and the X-containing raw material can be appropriately adjusted so that a core of the Chemical Formula 1 is obtained.

Subsequently, the first mixture is subjected to a first heat treatment and cooled to prepare a cooling product. The first heat treatment process is, for example, after preliminary heat treatment in the range of 300° C. to 500° C., followed by heating in the range of 700° C. to 900° C. at a heating rate of 1° C./min to 10° C./min. After raising the temperature, it can be carried out as a process of maintaining at this temperature for 1 hour to 48 hours. The first heat treatment process can be carried out while inflowing oxygen from 100 ml/min to 100,000 ml/min.

When the primary heat treatment process is performed under the temperature condition, particularly while oxygen is inflowed, there may be merit in improving the cycle-life. According to the first heat treatment process, the core primary particles of the Chemical Formula 1 assemble to form secondary particles.

The cooling process can be carried out up to room temperature by a conventional method, for example, natural cooling.

The cooling product is washed with a first solution containing a compound containing any one or more elements of Group 5 and Group 6 and a second solution containing a source of S to prepare a cleaned product. With this process, residual lithium on the surface of the product can be removed, and the cooling product can also be coated with a solution containing a compound containing any one or more elements of group 5 and group 6 and a source of S. At this time, the first solution and the second solution may exist impregnated into the first particles.

A compound containing one or more of the Group 5 and Group 6 elements is ammonium meta-tungstate, ammonium para-tungstate, tungsten oxide, or tungsten halide (halide can be F, Cl, I or combination thereof), tungsten hexaethoxide, tungsten isopropoxide, tungsten boride, tungsten nitride, tungsten carbonyl, or a combination thereof, and the S raw material source may be ammonium sulfate, $Li_2SO_4$, S or combination thereof.

In the solution, the solvent may be water, ethanol, propanol or a combination thereof.

The solution may contain 0.0001M to 0.1M, or 0.001M to 0.005M of a compound containing any one or more elements of Group 5 and Group 6 elements. In addition, the solution may include 0.01M to 0.5M of the S raw material source, and may also include 0.01M to 0.2M. When the solution includes the element-containing compound and S raw material source in the range, it is possible to effectively manufacture a positive electrode active material having a further improved cycle characteristic and a low resistance increase rate while maintaining excellent initial efficiency and initial resistance.

Then, the cleaning product is mixed with the second coating raw material to form a second mixture. The mixing process can be carried out as a dry process that does not use a solvent. The second coating raw material may include boron compound, LiOH, and $Li_2SO_4$. That is, $Li_2CO_3$ included in the second coating of the finally obtained positive electrode active material is formed by the internal reaction of the raw materials input during the manufacturing process, and is not formed by inputting a separate raw material.

The boron compound may be $H_3BO_3$, boron oxide, boron nitride, $B_4C$, $B_2H_6$, $B_2F_4$, $B_2Cl_4$, $B_2Br_4$, $B_2I_4$ or a combination thereof. The amount of the boron compound can be used so that boron is included in an amount of 300 ppm to 2,000 ppm, more specifically, 300 ppm to 1,000 ppm, based on the total amount of the second coating raw material.

The amount of LiOH may be in the range of 100 ppm to 1,000 ppm, more specifically 50 ppm to 700 ppm, and more specifically 120 ppm to 300 ppm, based on the entire second coating raw material. When the content of LiOH injected as the second coating raw material satisfies the range, it is possible to manufacture slurry in a state that can be applied to the electrode when manufacturing a positive electrode by suppressing the gelation phenomenon of slurry caused by residual lithium.

The $Li_2SO_4$ content may be in the range of 10 ppm to 500 ppm, more specifically 10 ppm to 200 ppm, more specifically 10 ppm to 100 ppm, and more specifically 20 ppm to 5 ppm, based on the entire second coating raw material. When the content of the $Li_2SO_4$ satisfies the range, it is a lithium secondary battery with excellent cycle-life characteristics by improving the mobility of lithium ions on the surface of the positive electrode active material, can be implemented because a Li—B—C-Sat type ion conductor is formed on the surface.

That is, in one embodiment, the input amount of LiOH and $Li_2SO_4$ is smaller than that of LiOH and $Li_2SO_4$ present as the second coating material of the finally obtained positive electrode active material. This is expected to be caused by the reaction of lithium and metal raw materials present in lithium metal oxide in the secondary heat treatment process after mixing with the second coating raw material.

Subsequently, the second mixture can be subjected to a second heat treatment. This second heat treatment process can be carried out in the temperature range of 200° C. to 450° C., and the heat treatment time can range from 1 hour to 12 hours.

As the second heat treatment process is carried out, the compound containing one or more elements from the group 5 and group 6 elements, and the S raw material source, included in the first solution and the second solution are decomposed, the first coating material including any one or more elements of the group the group 5 element and 6 element, and S, will be present in the positive electrode active material. In addition, the boron compound is also decomposed and exists as boron (B) in the positive electrode active material, and LiOH and $Li_2SO_4$ remain and exist as LiOH and $Li_2SO_4$ in the positive electrode active material. In addition, according to the second heat treatment process, some of LiOH may react with $CO_2$ in the atmosphere to form $Li_2CO_3$, and this $Li_2CO_3$ may exist in the positive electrode active material.

Since the compound containing any one or more elements of the Group and Group 6 elements and the S raw material source are used in the form of a solution, as described above, they can be impregnated between primary particles and can exist on the secondary particle surface, so that within the final an active material, it is present on at least part of the primary particle surface and at least part of the secondary particle surface. Due to this, it is possible to more effectively reduce the resistance increase rate.

In addition, since the mixing of LiOH, boron compound and $Li_2SO_4$ is performed in a dry process, LiOH, B and $Li_2SO_4$ exist only on the secondary particle surface, and $Li_2CO_3$ also exists only on the secondary particle surface.

According to another embodiment, a lithium secondary battery including a positive electrode, a negative electrode and an electrolyte is provided.

The positive electrode includes a current collector and a positive electrode active material layer including a positive electrode active material formed on the current collector. The positive electrode active material includes a positive electrode active material according to an embodiment.

In the positive electrode, the content of the positive electrode active material may be 90 wt % to 98 wt % with respect to the entire weight of the positive electrode active material layer.

In one embodiment, the positive electrode active material layer may further include a binder and a conductive material. In this case, the content of the binder and the conductive material may be 1 wt % to 5 wt %, respectively, with respect to the entire weight of the positive electrode active material layer.

The binder serves to attach the positive electrode active material particles well to each other and to attach the positive electrode active material to the current collector well. Representative examples of the binder include polyvinyl alcohol, carboxymethylcellulose, hydroxypropylcellulose, diacetylcellulose, polyvinylchloride, carboxylated polyvinylchloride, polyvinylfluoride, polymers containing ethylene oxide, polyvinylpyrrolydone, polyurethane, polytetrafluoroethylene, polyvinylidene fluoride, polyethylene, polypropylene, styrene-butadiene rubber, acrylated styrene-butadiene rubber, epoxy resin, nylon, etc. may be used, but are not limited thereto.

The conductive material is used to impart conductivity to the electrode, and any electronic conductive material can be used without causing chemical change in the battery to be configured. Examples of the conductive material include carbon-based materials such as natural graphite, artificial graphite, carbon black, acetylene black, ketchen black, and carbon fiber; metal-based materials such as metal powder or metal fibers such as copper, nickel, aluminum, and silver; conductive polymers such as polyphenylene derivatives; or a conductive material containing a mixture thereof.

As the current collector, aluminum foil, nickel foil, or a combination thereof may be used, but is not limited thereto.

The positive electrode active material layer is formed by mixing the positive electrode active material, a binder and optionally a conductive material in a solvent to prepare an active material composition, and applying the active material composition to a current collector. Since such an active material layer formation method is widely known in the art, a detailed description thereof will be omitted in this specification. As the solvent, N-methylpyrrolidone and the like can be used, but is not limited thereto.

The negative electrode may include a current collector and a negative active material layer formed on the current collector and including the negative active material according to an embodiment.

In the negative active material layer, the content of the negative active material in the negative active material layer may be 80 wt % to 98 wt % with respect to the entire weight of the negative active material layer.

The negative active material layer includes a binder and may optionally further include a conductive material. The content of the binder in the negative active material layer may be 1 wt % to 5 wt % based on the entire weight of the negative active material layer. In addition, when the conductive material is further included, 90 wt % to 98 wt % of the negative active material, 1 wt % to 5 wt % of the binder, and 1 wt % to 5 wt % of the conductive material may be used.

The negative active material includes a material capable of intercalating/deintercalating lithium ions reversibly, lithium metal, an alloy of lithium metal, a material capable of doping and undoping lithium, or a transition metal oxide.

A material that can intercalate/deintercalate the lithium ion reversibly is a carbon material, any generally-used carbon-based negative active material can be used in a lithium ion secondary battery, and typical examples thereof include crystalline carbon, amorphous carbon or combination thereof.

The alloy of the lithium metal is from the group consisting of lithium and Na, K, Rb, Cs, Fr, Be, Mg, Ca, Sr, Si, Sb, Pb, In, Zn, Ba, Ra, Ge, Al and Sn. Any alloy of selected metals may be used.

Materials capable of doping and undoping the lithium include Si, SiOx ($0<x<2$), Si—Y alloy (the Y is an element selected from the group consisting of an alkali metal, an alkaline earth metal, a group 13 element, a group 14 element, a transition metal, and a rare earth element and its combination thereof, but not Si), Sn, $SnO_2$, Sn—Y (the Y is an element selected from the group consisting of an alkali metal, an alkaline earth metal, a group 13 element, a group 14 element, a transition metal, a rare earth element and the combination thereof, not Sn), and the like.

Examples of the transition metal oxide include vanadium oxide and lithium vanadium oxide. The negative active material layer also includes a binder and may optionally further include a conductive material.

The binder serves to adhere the negative active material particles to each other well and to adhere the negative active material to the current collector well. As the binder, a non-aqueous binder, an aqueous binder, or a combination thereof may be used.

The non-aqueous binders include ethylenepropylene copolymer, polyacrylnitrile, polystyrene, polyvinyl chloride, carboxylated polyvinyl chloride, polyvinyl fluoride, polyurethane, polytetrafluoroethylene, polyvinylidene fluoride, polyethylene, polypropylene, polyamideimide, polyimide or a combination thereof.

As the aqueous binder, styrene-butadiene rubber, acrylated styrene-butadiene rubber, acrylonitrile-butadiene rubber, acryl rubber, butyl rubber, fluororubber, polymers containing ethylene oxide, polyvinylpyrrolidone, and polyepichlorohydrine, polyphosphazene, ethylenepropylene diene copolymer, polyvinylpyridine, chlorosulfonated polyethylene, latex, polyester resin, acryl resin, phenol resin, epoxy resin, polyvinyl alcohol or a combination thereof.

When an aqueous binder is used as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. Na, K or Li can be used as the alkali metal. The amount of the thickener used may be 0.1 part by weight to 3 parts by weight with respect to 100 parts by weight of the negative active material.

The conductive material is used to impart conductivity to the electrode, and any electronic conductive material can be used without causing chemical change in the battery. Examples of the conductive material include carbon-based materials such as natural graphite, artificial graphite, carbon black, acetylene black, ketchen black, and carbon fiber; metal-based materials such as metal powder or metal fibers such as copper, nickel, aluminum, and silver; conductive polymers such as polyphenylene derivatives; or a conductive material containing a mixture thereof.

As the current collector, one selected from the group consisting of copper foil, nickel foil, stainless steel foil, titanium foil, nickel foam, copper foam, a conductive metal-coated polymer substrate, and a combination thereof may be used.

The negative electrode is formed by mixing a negative active material, a binder and optionally a conductive material in a solvent to prepare an active material composition, and applying the active material composition to a current collector. Water can be used as the solvent.

Since such a negative electrode formation method is widely known in the art, a detailed description will be omitted in this specification.

The electrolyte includes a non-aqueous organic solvent and a lithium salt.

The non-aqueous organic solvent serves as a medium through which ions involved in the electrochemical reaction of the battery can move.

As the non-aqueous organic solvent, carbonate-based, ester-based, ether-based, ketone-based, alcohol-based, or aprotic solvents may be used.

The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), etc. may be used. The ester solvent includes methyl acetate, ethyl acetate, n-propyl acetate, dimethyl acetate, methyl propionate, ethyl propionate, propyl propionate, decanolide, mevalonolactone, caprolactone and the like can be used. As the ether-based solvent, dibutyl ether, tetraglyme, diglyme, dimethoxyethane, 2-methyltetrahydrofuran, tetrahydrofuran, and the like may be used. In addition, as the ketone-based solvent, cyclohexanone or the like may be used. In addition, ethanol, isopropyl alcohol, etc. may be used as the alcohol-based solvent, and as the aprotic solvent, nitriles such as R—CN (R is a hydrocarbon group having a carbon atom of 2 to 20 in a linear, branched, or ring structure, including double bonding, aromatic ring or ether linkage), amides such as dimethylformamide, dioxolanes such as 1,3-dioxolane, sulfolanes, etc. may be used.

The non-aqueous organic solvent may be used alone or in combination with one or more of them. When using one or more mixtures, the mixing ratio can be appropriately adjusted according to the desired battery performance, which can be widely understood by those skilled in the art.

In addition, in the case of the carbonate-based solvent, it is good to use a mixture of cyclic carbonate and chain carbonate. In this case, the performance of the electrolyte solution can be excellent when cyclic carbonate and chain carbonate are mixed in a volume ratio of 1:1 to 1:9.

When the non-aqueous organic solvent is mixed and used, a mixed solvent of cyclic carbonate and chain carbonate, a mixed solvent of cyclic carbonate and propionate solvent or a mixed solvent of cyclic carbonate, chain carbonate and propionate solvent can be used. As the propionate-based solvent, methyl propionate, ethyl propionate, propyl propionate or a combination thereof may be used.

At this time, when mixing cyclic carbonate and chain carbonate or cyclic carbonate and propionate-based solvent, mixing at a volume ratio of 1:1 to 1:9 can show excellent performance of the electrolyte solution. In addition, when cyclic carbonate, chain carbonate and propionate-based solvent are mixed and used, they can be mixed in a volume ratio of 1:1:1 to 3:3:4. Of course, the mixing ratio of the solvents may be appropriately adjusted according to desired properties.

The non-aqueous organic solvent may further include an aromatic hydrocarbon-based organic solvent in addition to the carbonate-based solvent. At this time, the carbonate-based solvent and the aromatic group hydrocarbon-based organic solvent may be mixed in a volume ratio of 1:1 to 30:1.

As the aromatic group hydrocarbon-based organic solvent, an aromatic group hydrocarbon-based compound of Chemical Formula 2 below may be used.

[Chemical Formula 2]

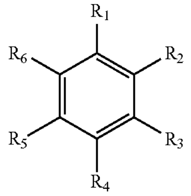

(In the Chemical Formula 2, $R_1$ to $R_6$ are the same as or different from each other and are selected from the group consisting of hydrogen, halogen, an alkyl group having 1 to 10 carbon atoms, a haloalkyl group, and a combination thereof.)

Specific examples of the aromatic group hydrocarbon hydrogen-based organic solvent include benzene, fluorobenzene, 1,2-difluorobenzene, 1,3-difluorobenzene, 1,4-difluorobenzene, 1,2,3-Trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula 3 as a cycle-life improving additive to improve battery cycle-life.

[Chemical Formula 3]

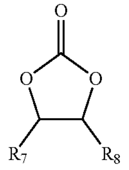

(In the Chemical Formula 3, $R_7$ and $R_8$ are the same as or different from each other and are selected from the group consisting of hydrogen, halogen group, cyano group (CN), nitro group ($NO_2$) and fluorinated alkyl group having 1 to 5 carbon atoms, and at least one of the $R_7$ and $R_8$ is selected from the group consisting of a halogen group, a cyano group (CN), a nitro group ($NO_2$) and a fluorinated alkyl group having 1 to 5 carbon atoms, and both $R_7$ and $R_8$ are not hydrogen.)

Representative examples of the ethylene carbonate compound include difluoroethylene carbonate, chloroethylene carbonate, dichloroethylene carbonate, bromoethylene carbonate, dibromoethylene carbonate, nitroethylene carbonate, cyanoethylene carbonate or fluoroethylene carbonate. In the case of further use of these cycle-life improving additives, the amount thereof may be appropriately adjusted.

The electrolyte may further include vinyl ethylene carbonate, propane sultone, succinonitrile or a combination thereof, and the amount used may be appropriately adjusted.

The lithium salt is a material that dissolves in an organic solvent and acts as a supply source of lithium ion in the battery to enable basic operation of the lithium secondary battery and promotes the movement of lithium ion between the positive electrode and the negative electrode. Representative examples of these lithium salts can contain one or more than one as a supporting electrolytic salt, which are selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural numbers, for example, integers from 1 to 20), LiCl, LiI and $LiB(C_2O_4)_2$ (lithium bis(oxalato) borate:LiBOB). It is recommended to use the concentration of lithium salt within the range of 0.1M to 2.0M. When the concentration of lithium salt is included in the range, excellent electrolyte performance can be shown because the electrolyte has appropriate conductivity and viscosity, and lithium ion can move effectively.

Depending on the type of lithium secondary battery, a separator may exist between the positive electrode and the negative electrode. As such a separator, polyethylene, polypropylene, polyvinylidene fluoride or a multilayer of two or more of these may be used, and polyethylene/polypropylene 2-layer separator, polyethylene/polypropylene/polyethylene 3-layer separator, polypropylene/polyethylene/polypropylene 3-layer separator can be used.

FIG. 1 shows an exploded perspective view of a lithium secondary battery according to an embodiment of the present invention. Although the lithium secondary battery according to one embodiment is described as an example of a prismatic shape, the present invention is not limited thereto, and can be applied to various types of batteries such as cylindrical and pouch-type.

FIG. Referring to 1, a lithium secondary battery 100 according to an embodiment may include an electrode assembly 40 wound between a positive electrode 10 and a negative electrode 20 with a separator 30 interposed therebetween, and a case 50 in which the electrode assembly 40 is embedded. The positive electrode 10, the negative electrode 20 and the separator 30 may be impregnated in an electrolyte solution (not shown).

An exemplary embodiment and a Comparative Example will be described below. Such an exemplary embodiment described below is only an exemplary embodiment, and the present invention is not limited to the exemplary embodiment described below.

Preparation Example 1—Preparation of Positive Electrode Active Material Precursor Using $NiSO_4{\cdot}6H_2O$ as a nickel raw material, $CoSO_4{\cdot}7H_2O$ as a cobalt raw material, and $MnSO_4{\cdot}H_2O$ as a manganese raw material, these raw materials were dissolved in distilled water to prepare a metal salt aqueous solution.

The metal salt aqueous solution is purged with $N_2$ using a co-precipitation reaction device, and $NH_4(OH)$ is added as a chelating agent to the co-precipitation reaction device while the temperature of the reaction device is maintained at 50° C. A co-precipitation process was performed using NaOH for pH control.

The precipitate obtained according to the co-precipitation process was filtered, washed with distilled water, and dried in an oven at 100° C. for 24 hours to obtain $(Ni_{0.88}Co_{0.05}Mn_{0.07})(OH)_2$, precursor of positive electrode active material with an average particle diameter of 14.8 μm.

Comparative Example 1—Preparation of Ni 85% Positive Electrode Active Material Based on 1 mole of the positive electrode active material precursor prepared in Preparation Example 1, a first mixture was prepared by uniformly mixing 1.05 moles of LiOH $H_2O$ (Samjeon Chemical, battery grade) and an X-containing compound. At this time, $ZrO_2$ (Aldrich, 3N) and $Al(OH)_3$ (Aldrich, 4N) were used as the X-containing compound, and the amount of the X-containing compound was used as the amount to obtain the desired compound composition.

The first mixture was charged into a tube furnace, and the first heat treatment was performed while oxygen was inflowed at 200 mL/min. The first heat treatment process was carried out by preliminary heat treatment at 480° C. for 5 hours, followed by raising the temperature to 760° C. at a temperature raising speed of 5° C./min, and maintaining at this temperature for 16 hours. Subsequently, the first heat treatment product was naturally cooled to 25° C. to prepare a positive electrode active material, which is a cooling product expressed as $LiNi_{0.85}Co_{0.09}Mn_{0.06}Zr_{0.0037}Al_{0.0001}O_2$. The cooling product was formed as secondary particles assembled from primary particles.

Comparative Example 2—Preparation of Ni 85% Positive Electrode Active Material Containing 2,500 ppm LiOH and 2000 ppm $Li_2CO_3$ The cooled product prepared in the Comparative Example 1 was washed with distilled water, filtered, and dried.

The obtained dried product was subjected to secondary heat treatment at 280° C. for 5 hours to obtain a positive electrode active material having a core containing secondary particles in which primary particles expressed as $LiNi_{0.85}Co_{0.09}Mn_{0.06}Zr_{0.0037}Al_{0.0001}O_2$ were assembled, and a coating layer containing 500 ppm LiOH, and 2,000 ppm $Li_2CO_3$ on the surface of the core.

Comparative Example 3—Ni 85% Positive Electrode Active Material Containing W 200 ppm, LiOH 2,500 ppm and $Li_2CO_3$ 2,000 ppm The cooling product prepared in the Comparative Example 1 was washed with water using an aqueous solution in which 0.0004M ammonium meta-tungstate (AMT) was added to distilled water, filtered, and dried.

The obtained dried product was treated with secondary heat at 280° C. for hours to obtain a positive electrode active material having a core containing secondary particles in which primary particles expressed as $LiNi_{0.85}Co_{0.09}Mn_{0.06}Zr_{0.0037}Al_{0.0001}O_2$ were assembled, and a coating layer containing 2,500 ppm LiOH, 2,000 ppm $Li_2CO_3$, 500 ppm B and 300 ppm $Li_2SO_4$ on the surface of the core.

Exemplary Embodiment 1—Ni 85% Positive Electrode Active Material Containing W 200 ppm, LiOH 2500 ppm, $Li_2CO_3$ 2,000 ppm, B 500 ppm and $Li_2SO_4$ 500 ppm The cooling product prepared in the Comparative Example 1 was washed with water using an aqueous solution in which 0.0004M ammonium meta-tungstate (AMT) and 0.04M ammonium sulfate (AS) were added to distilled water, and then filtered and dried.

The obtained dry product was dry mixed with 500 ppm of LiOH, 500 ppm of $H_3BO_3$ and 30 ppm of $Li_2SO_4$, and secondary heat treatment was performed on this mixture at 280° C. for 5 hours to prepare a positive electrode active material. The manufactured positive electrode active material includes a core containing secondary particles in which primary particles represented by $LiNi_{0.85}Co_{0.09}Mn_{0.06}Zr_{0.0037}Al_{0.0001}O_2$ are assembled, and a coating material positioned on the surface of the core, and the W and S positioned on the primary particle surface, and W, S, LiOH, $Li_2CO_3$, B, and $Li_2SO_4$ on the secondary particle surface, wherein the W content is 200 ppm, the LiOH content is 2,500 ppm, the $Li_2CO_3$ content is 2,000 ppm, and the B content is 500 ppm, and the $Li_2SO_4$ content was 500 ppm.

The AMT content and AS content used in the exemplary embodiment 1 and the Comparative Example 1 to 3 and the W, S and $Li_2SO_4$ content included in the active material are summarized in Table 1 below.

TABLE 1

| | Content of AMT (M) | Content of AS (M) | Content of W (ppm) | Content of B (ppm) | Content of $Li_2SO_4$ (ppm) |
|---|---|---|---|---|---|
| Comparative Example 1 | — | — | — | — | — |
| Comparative Example 2 | — | — | — | — | 300 |
| Comparative Example 3 | 0.0004 | 0.04 | 200 | — | 300 |
| exemplary embodiment 1 | 0.0004 | 0.04 | 200 | 500 | 500 |

(Preparation Example 2) Preparation of Half Cell

Positive electrode active material prepared according to Exemplary Embodiment 1 and Comparative Example 1 to 3, Denka black conductive material, and polyvinylidene fluoride binder (trade name: KF1100) were mixed at a weight ratio of 92.5:3.5:4, and this mixture was added to N-Methyl-2-pyrrolidone solvent to have a solid content of about 30 wt % to prepare a positive electrode active material slurry.

The slurry was coated on aluminum foil (Al foil, thickness: 15 μm), which is a positive electrode current collector, using a doctor blade (Doctor blade), dried, and rolled to prepare a positive electrode. The loading amount of the positive electrode was 14.6 mg/cm 2, and the rolling density was 3.1 g/cm 3.

A 2032 coin-type half cell was prepared by a conventional method using the positive electrode, lithium metal negative electrode (200 μm, Honzo metal), electrolyte solution and polypropylene separator. The electrolyte solution is the product obtained by dissolving 1M $LiPF_6$ in a mixed solvent of ethylene carbonate (EC), dimethyl carbonate (DMC) and ethylmethyl carbonate (EMC) (mixing ratio EC:DMC:EMC=3:4:3 volume ratio), and 1.5 wt % of vinylene carbonate was added to 100 wt % of the entire solution.

Experimental Example 1: SEM Evaluation

Measure the SEM of the positive electrode manufactured using the positive electrode active material manufactured in the exemplary embodiment 1 and the Comparative Example 1 to 3, and the result is shown in FIG. 2 to FIG. 5 (FIG. 2 and FIG. 3: exemplary embodiment 1, FIG. 4: Comparative Example 1, FIG. 5: Comparative Example 2, FIG. 5: Comparative Example 3).

As shown in FIG. 4, the surface of the positive electrode active material of Comparative Example 1, which was not subjected to the water washing process, was non-uniform, whereas as shown in FIG. 5, the surface of the positive electrode active material of Comparative Example 2, which was subjected to the water washing process was smooth. In addition, as shown in FIG. 6, it can be seen that the positive electrode active material of Comparative Example 3 containing only the first coating material does not have needle-like coating material on the surface.

On the other hand, the positive electrode active material of exemplary embodiment 1 including the first coating material and the second coating material is clearly seen that needle-like material exists on the surface, as shown in FIG. 2. In addition, from the SEM of FIGS. 2 and 3, the result of obtaining the major axis/minor axis length ratio (average ratio) was 0.27.

Experimental Example 2: Charge and Discharge Capacity, Initial Efficiency and Room Temperature 25° C. Initial Resistance Evaluation After aging the prepared coin-type half cell at room temperature 25° C. for hours, charging and discharging were performed.

Charging and discharging is performed once at 2.5V to 4.25V with constant current/constant voltage, 0.1 C charging and 0.1 C discharge under 1/20 C cut-off condition, and the charging capacity and discharge capacity are obtained, and the result is shown in Table 1 below. In addition, the ratio of discharge capacity to charge capacity was obtained, and the result is shown in Table 2 as one-time efficiency. When evaluating the capacity, the reference capacity was 215 mAh/g.

The initial resistance is 4.25V full-charge (charging rate: 100%) at 0.2 C, and while discharging at 0.2 C, the voltage value after 60 seconds and the change in voltage value for the current applied at this time, that is, the voltage change for seconds was measured and calculated. The results are shown in Table 2 below.

Experimental Example 3: High Temperature 45° C. Cycle and Resistance Increase Rate Evaluation The fabricated coin-type half cell was subjected to 30 cycles of 0.3 C charge and 0.3 C discharge under 1/20 C cut-off condition at 2.5V to 4.25V with constant current/constant voltage at 45° C. The ratio of one discharge capacity to discharge capacity in 30 cycles was obtained, and the result was shown in Table 3 as the cycle characteristic.

In addition, the resistance increase rate is 4.25V full-charge (charging rate: 100%) at 0.2 C at high temperature 45° C., 0.2 C discharge, and measuring the voltage fluctuation for 60 seconds to obtain the resistance once, and after performing full-charge and full-discharge 30 times, the resistance measured 30 times with voltage fluctuations for 60 seconds was obtained, and the results are shown in Table 3 below. In addition, 30-time resistance ratio for 1-time resistance was obtained, and the results are shown in Table 3 below.

TABLE 2

| | Charging capacity 0.1 C (mAh/g) | 0.1 C discharge capacity (mAh/g) | One-time efficiency | Initial resistance (Ω) |
|---|---|---|---|---|
| Comparative Example 1 | 224.5 | 201.2 | 89.6 | 26.5 |
| Comparative Example 2 | 220.4 | 196.5 | 89.2 | 25.6 |
| Comparative Example 3 | 229.5 | 209.5 | 91.3 | 21.1 |
| exemplary embodiment 1 | 231.4 | 214.0 | 92.5 | 19.7 |

TABLE 3

| | High temperature cycle characteristic (%) | One-time resistance (Ω) | 30 times resistance (Ω) | Ratio of increasing resistance (%) |
|---|---|---|---|---|
| Comparative Example 1 | 98.5 | 15.5 | 30.1 | 94.2 |
| Comparative Example 2 | 98.6 | 13.8 | 30.5 | 121.0 |
| Comparative Example 3 | 97.5 | 12.5 | 22.2 | 77.6 |
| exemplary embodiment 1 | 96.4 | 11.8 | 17.3 | 46.7 |

As shown in the Tables 2 and 3, it can be seen that the half cell using the positive electrode active material of Example Embodiment 1 exhibits a low resistance increase rate at high temperature, while maintaining low initial resistance and excellent one-time efficiency and high temperature cycle characteristic. On the other hand, it can be seen that the positive electrode active material of Comparative Example 1 to 3 has a rather low one-time efficiency and a very large resistance increase rate.

The present invention is not limited to the exemplary embodiment, but can be manufactured in a variety of different forms, and a person of an ordinary skill in the technical field to which the present invention belongs does not change the technical idea or essential characteristics of the present invention. It will be appreciated that it may be embodied in other specific forms. Therefore, the exemplary embodiment described above should be understood as illustrative in all respects and not limiting.

What is claimed is:

1. A positive electrode active material for a lithium secondary battery, comprising:

a core containing a lithium nickel-based compound having a Ni content of 80 mol % or more; and a coating material positioned on at least a portion of the core surface;

wherein, the coating material includes a first coating material containing at least one of group 5 elements and group 6 elements; and S; and a second coating material including B, LiOH, $Li_2CO_3$ and $Li_2SO_4$, and the second coating material is a needle-like material;

wherein, the needle-like material has a major axis and a minor axis, and a length ratio of the major axis L1 and the minor axis L2 satisfies the relationship of Equation 1, 0.1<(L2/L1)<1.00 [Equation 1].

2. The positive electrode active material of claim 1, wherein:

the core in the positive electrode active material includes a secondary particle assembled with at least one primary particle including the lithium nickel-based compound.

3. The positive electrode active material of claim 1, wherein:

the lithium nickel-based compound is represented by Chemical Formula 1 below, $$Li(Ni_{1-(x+y)}Co_xMn_yX_z)O_2, \quad \text{[Chemical Formula 1]}$$

wherein in the Chemical Formula 1, $0<(x+y)<0.2$, $0 \leq x \leq 0.2$, $0 \leq y \leq 0.2$ and $0 \leq z \leq 0.2$, and X includes at least one or more of Zr, Al, Ti, B, Mg, Ce, Si, Na, and Zn.

4. The positive electrode active material of claim 2, wherein:

the first coating material is positioned on at least a portion of the primary particle surface and at least a portion of the secondary particle surface.

5. The positive electrode active material of claim 2, wherein:

the second coating material is to position at least part of the secondary particle surface.

6. The positive electrode active material of claim 1, wherein:

at least one of the Group 5 and Group 6 elements is V, Nb, W or a combination thereof.

7. The positive electrode active material of claim 1, wherein:

the content of the group 5 element and group 6 element is 10 ppm to 10,000 ppm based on the total amount of the positive electrode active material.

8. The positive electrode active material of claim 1, wherein:

the content of the LiOH is 100 ppm to 10,000 ppm based on the total amount of the positive electrode active material.

9. The positive electrode active material of claim 1, wherein:

the content of the $Li_2SO_4$ is 10 ppm to 3,000 ppm based on the total amount of the positive electrode active material.

10. A lithium secondary battery comprising:

a positive electrode comprising the positive electrode active material of claim 1;

negative electrode; and non-aqueous electrolyte.

* * * * *